Patented Oct. 4, 1949

2,483,393

UNITED STATES PATENT OFFICE 2,483,393

ENAMEL OPACIFIER AND METHOD OF PRODUCING AN ENAMEL THEREFROM

William J. Baldwin, Snyder, N. Y., assignor, by mesne assignments, to National Lead Company, New York, N. Y., a corporation of New Jersey No Drawing. Application November 20, 1945, Serial No. 629,911

6 Claims. (Cl. 106—48)

The present invention relates to an opacifier for use in vitreous enamels and particularly to a mill addition opacifier for use with enamel frits which develop opacity on heating in the enameling cycle, that is, frits opacified with zirconium or titanium compounds.

In the enameling of metal and particularly sheet iron and steel, the ultimate object is to obtain a vitreous coating upon the metal base which presents a high degree of opacity as this is an esthetic requirement in enameling, as great a coverage as possible, and a finished vitreous coating resistant to strains and impact incident to assembly, storage, transporation or use.

A very important feature of a finished enamel article and, therefore, of the enamel to be applied to the article, is the diffuse reflectance or opacity of the enamel coating. In general, the opacity may be obtained by adding materials to the glass composing the frit as, for instance, certain compounds of fluorine or antimony, to mention but two of the more popular older types, or zircon as a more recent opacifier. Or, opacifiers may be added to the frit subsequent to its manufacture and milled therewith as a separate individual ingredient, so-called mill addition opacifiers.

Vitreous enamel coatings of exceptional properties have been produced in recent years which depend for their opacity upon the presence of compounds of zirconium in the frit. Patents 1,944,938 of January 30, 1934, to C. J. Kinzie, and 2,326,348 of August 10, 1943, to Frost and Commons relate to enameling or glazing frit compositions depending upon zircon type opacifiers to obtain relatively high reflectance values; additional phases of this important field are described in patents to Bahnsen et al. 2,250,456 and 2,250,457 of July 29, 1941, and 2,324,812 of July 20, 1943. Frits of this type, as well as acid-resisting frits containing titanium compounds, develop opacity in the enameling cycle, in contrast with frits of other types wherein the opacity has been developed in the manufacture of the frit.

In general, the greater the amount of an opacifier in a frit, the higher the opacity of the finished enamel; however, it is known that, at times, surface difficulties in the enamel may be caused by attempts to include too great an amount of an opacifier in the frit glass. These surface difficulties decrease the esthetic value of the enamel coating and, therefore, in effect, defeat one of the purposes of the addition of the opacifier.

In accordance with the present invention, the opacity of enamels of the type which develop opacity in heating in the enameling cycle may have their opacity increased by the employment of specially prepared opacifiers containing titanium oxide as a mill addition whereby the reflectance value of the finished enamel is increased to an exceptional degree.

In accordance with the present invention, the special mill addition opacifier may be prepared by suitably combining materials containing titanium oxide, aluminum oxide and phosphorus pentoxide or combining the oxides themselves. A mixture of suitable raw material containing the above oxides, or of the oxides themselves, is calcined in the neighborhood of 2000° F. or at such other temperature at which ceramic combination of the compounds occurs to produce a relatively homogeneous sinter. After calcining, the resultant product is, ground to appropriate fineness, that is, on the order of ½ to 1 micron, preferably toward the lower limit of this range. Products so prepared, when used to the extent of about 2 to 4% as a mill addition to a commercial zirconium-opacified frit result in enamels of increased reflectance values as compared to values obtained with similar enamels prepared without the presence of such mill addition material. In general, the composition of the mill addition opacifier of the present invention comprises the ternary system of phosphorus pentoxide, aluminum oxide and titanium oxide, the titanium oxide varying from about 10 to about 40%, the aluminum oxide from about 25 to 65%, and phosphorus pentoxide 25 to 45%, of the finished mill addition opacifier.

Instead of employing the pure oxides, good results are obtained by employing the accepted raw materials used in the manufacture of enamel frits, that is to say, amblygonite, aluminum metaphosphate, ammonium acid phosphate, aluminum hydrate, and various usual sources of titanium oxide, aluminum oxide and phosphorus pentoxide.

As a specific example of the invention a raw batch was made up of the following ingredients:

COMPOSITION I (OPACIFIER)

| | Parts by weight |
|---|---|
| Amblygonite | 58 |
| Aluminum hydrate | 59 |
| Titanium oxide | 15 | which corresponded to an oxide formula of:

| | Percent |
|---|---|
| $P_2O_5$ | 27 |
| $Al_2O_3$ | 58 |
| $TiO_2$ | 15 | or an approximate molecular formula of $$TiO_2.P_2O_5.3Al_2O_3$$

(neglecting ingredients which are not here significant).

The raw batch was ground together and heated to 2000° F. and, after the calcination, was ground to ½ micron in size. 2% of the finely ground and so prepared mill addition opacifier was added to and ground with a standard zirconium-opacified frit of the type which produces opacity in the enameling cycle and having an oxide formula of the approximate composition as follows:

COMPOSITION II (FRIT)

| Oxide ingredients | Per cent |
|---|---|
| $SiO_2$ | 30 |
| $ZrO_2$ | 14 |
| $TiO_2$ | 0.1 |
| $Al_2O_3$ | 9 |
| $ZnO$ | 3 |
| $CaO$ | 8 |
| $P_2O_5$ | 2.5 |
| $B_2O_3$ | 18 |
| $F$ | 5 |
| $K_2O$ | 2 |
| $Na_2O$ | 13 |

Additional minor misc. ingredients.

The oxides shown being calculated according to conventional practice and fluorides being indicated by the fluorine content, the total of percentage indicated exceeds 100. The milled zirconium opacified frit and special mill addition opacifier of Composition I produced an enameled article having, at an application of 39.6 g. per sq. ft., a reflectance of 73.0. The frit alone at the same application rate produced an enameled article of a reflectance of 70.6.

Although, in general, the temperature employed in the preparation of the mill addition opacifier of the present invention must be sufficiently high for ceramic combination, a product giving increased opacity is obtained when the calcination is carried out at relatively high temperatures than when carried out at lower temperatures. Thus, separate samples of the product corresponding to the formula $$TiO_2.P_2O_5.3Al_2O_3$$

were produced by heating a portion of a mix to 1600° F. and another portion to 2000° F., both batches being ground to the same extent. Each of these products was added to the extent of 2% to the commercial zirconium opacified frit of Composition II with the following results:

Table I

| Product calcined at 1600° F. | | Product calcined at 2000° F. | |
|---|---|---|---|
| Enamel Weight, grams/sq. ft. | Reflectance | Enamel Weight, grams/sq. ft. | Reflectance |
| 30.0 | 66.6 | 30.0 | 68.6 |
| 39.6 | 71.6 | 39.6 | 73.0 |
| 50.4 | 75.8 | 49.8 | 77.1 |

The employment of the special opacifier of the present invention possesses advantages over the usual zirconium oxide mill addition opacifier employed heretofore with zirconium opacified frits. The increase in reflectance obtained was quite general throughout the range of rate of application normally encountered in use.

The advantage of the special opacifier of the present invention over zirconia as a mill addition is strikingly shown in the results set forth in Table II:

Table II

| Application Weight, grs./sq. ft. dry | Reflectance of Zirconium Opacified Enamel No Opacifier | Reflectance of Zr. Opacified Enamel 2% Opacifier corresponding to $TiO_2.P_2O_5.3Al_2O_3$ | Reflectance of Zr. Opacified Enamel 2% Zirconium Oxide Opacifier |
|---|---|---|---|
| 30 | 64.0 | 68.5 | 64.0 |
| 40 | 70.6 | 74.0 | 70.8 |
| 50 | 74.0 | 77.0 | 74.8 |

Tests were made upon various other commercial zirconium opacified enamels and in every instance increase in reflectance was obtained by the employment of the composition of the instant invention as a mill addition opacifier.

By way of illustration, the compositions of the commercial zirconium opacified frits to which the mill addition of the present invention may be added with advantage may vary as follows:

COMPOSITION III (FRIT)

| | Per cent |
|---|---|
| $SiO_2$ | 25 to 40 |
| $Al_2O_3$ | 7 to 16 |
| $B_2O_3$ | 10 to 20 |
| $KNaO$ | 10 to 16 |
| $CaO$ | 3 to 7 |
| $F_2$ | 5 to 10 |
| $ZrO_2$ | 10 to 15 |
| $ZnO$ | 2 to 14 |
| $P_2O_5$ | 0.5 to 3 |
| $TiO_2$ | 0 to 2 |

Other mill addition compositions were prepared in which the relationship phosphorus pentoxide, titanium oxide and aluminum oxide varied. For instance, a composition constituting IV (opacifier) containing 12% titanium oxide, 45.5% aluminum oxide and 42.5% phosphorus pentoxide was prepared. The resulting product corresponded to the approximate formula $TiO_2.2P_2O_5.3Al_2O_3$. The oxides were calcined at 2000° F., and the batch ground to ½ to 1 micron. When used at 2% in place of the opacifier composition I, $TiO_2.P_2O_5.3Al_2O_3$, the following results were obtained:

| 2% Mill Addition of $TiO_2.2P_2O_5.3Al_2O_3$ | | No Mill Addition | |
|---|---|---|---|
| Application Weight, grms./sq. ft. | Reflectance | Application Weight, grms./sq. ft. | Reflectance |
| 30.0 | 67.0 | 30 | 64.0 |
| 39.6 | 72.0 | 40 | 70.6 |
| 49.8 | 76.4 | 50 | 74.0 |

Where the phosphorus pentoxide content was increased above about 45%, and the other ingredients varied beyond the limits referred to, little benefit was derived as a mill addition opacifier, probably by reason of extreme solubility of the addition. It will be noted that somewhat better reflectance results were obtained with an opacifier identified by the approximate formula $TiO_2.P_2O_5.3Al_2O_3$. In general opacifiers embodying my invention have a general formula of $TiO_2.nP_2O_5.3Al_2O_3$, $n$ being a figure having the above-indicated limits of 1 and 2.

Using the preferred $TiO_2P_2O_5.3Al_2O_3$ opacifier as a mill addition to titanium oxide opacified frits of the type which develop opacity in the enameling cycle, a definite increase in opacity was also observed. For instance, an enamel of the representative composition V as follows:

| Raw Batch Formula, Per Cent | | Oxide Formula, Per Cent | |
|---|---|---|---|
| Feldspar | 26.5 | $K_2O$ | 4.00 |
| Borax | 22.5 | $Na_2O$ | 12.00 |
| Quartz | 26.5 | CaO | 1.00 |
| $NaNO_3$ | 4.1 | ZnO | 5.00 |
| ZnO | 4.1 | $F_2$ | 2.00 |
| $TiO_2$ | 9.2 | $Al_2O_3$ | 8.00 |
| Cryolite | 6.1 | $B_2O_3$ | 10.00 |
| $BaCO_3$ | 1.0 | $SiO_2$ | 48.32 |
|  |  | $TiO_2$ | 9.55 | was improved by addition of 4% of the special mill addition opacifier. Final readings were as set forth in Table III:

*Table III*

| Titanium Opacified Frit No Opacifier | | Titanium Opacified Frit plus 4% of $TiO_2$, $P_2O_5$, $3Al_2O_3$ | |
|---|---|---|---|
| Weight | Reflectance | Weight | Reflectance |
| 30.0 | 61.2 | 30.6 | 63.9 |
| 40.2 | 67.9 | 40.2 | 70.0 |
| 50.4 | 71.1 | 49.2 | 72.9 |

From the foregoing, it will be apparent that a significant increase in opacity of enamels of the type that develop opacity in the enameling cycle can be obtained by adding a special titanium oxide, phosphorus pentoxide, aluminum oxide mill addition opacifier to such frits. Although the preferred opacifier corresponds approximately to the approximate formula $TiO_2.P_2O_5.3Al_2O_3$, excellent results are obtainable with compositions within the range 10 to 40% titanium oxide, 25% to 65% aluminum oxide and 25% to 45% phosphorus pentoxide.

What is claimed is:

1. A fritted composition suitable for use as a mill addition opacifier for enamel frits of the type which develop opacity in heating which comprises 10 to 40% titanium oxide, 25 to 65% aluminum oxide and 25 to 45% phosphorus pentoxide.

2. A mill addition opacifier suitable for admixture to enamel compositions of the type developing opacity during the enamelling cycle, said opacifier having the approximate formula $TiO_2.nP_2O_5.3Al_2O_3$ in which $n$ is a figure within the limits of 1 and 2.

3. A mill addition opacifier suitable for admixture to enamel compositions of the type containing zirconium oxide which develop opacity upon glazing, said opacifier consisting of a calcined material having the approximate formula $TiO_2.P_2O_5.3Al_2O_3$.

4. The method of producing an enamel of high opacity from an enamel frit composition containing an opacifier selected from the class consisting of zirconium and titanium opacifier compounds and which develop opacity in the enameling cycle, which comprises adding to said frit 2 to 4% of an opacifier comprising in a calcined state 10 to 40% of titanium oxide, 25 to 65% aluminum oxide and 25 to 45% phosphorus pentoxide and heating to an elevated enamel-forming temperature.

5. The method of producing an enamel of high opacity from an enamel frit composition containing an opacifier selected from the class consisting of zirconium and titanium opacifier compounds and which develop opacity in the enameling cycle, which comprises adding to said frit 2 to 4% of an opacifier in a calcined state having the approximate formula $TiO_2.nP_2O_5.2Al_2O_3$ in which $n$ is a figure within the limits of 1 and 2.

6. The method of producing an enamel of high opacity from an enamel frit composition containing an opacifier selected from the class consisting of zirconium and titanium opacifier compounds and which develop opacity in the enameling cycle, which comprises adding to said frit 2 to 4% of an opacifier in a calcined state having the approximate formula $TiO_2.P_2O_5.3Al_2O_3$.

WILLIAM J. BALDWIN.

REFERENCES CITED

The following references are of record in the file of this patent:

UNITED STATES PATENTS

| Number | Name | Date |
|---|---|---|
| 1,314,831 | Preusser | Sept. 2, 1919 |